O. TIRRILL.
Gas Apparatus.
No. 55,395.
Patented June 5, 1866.
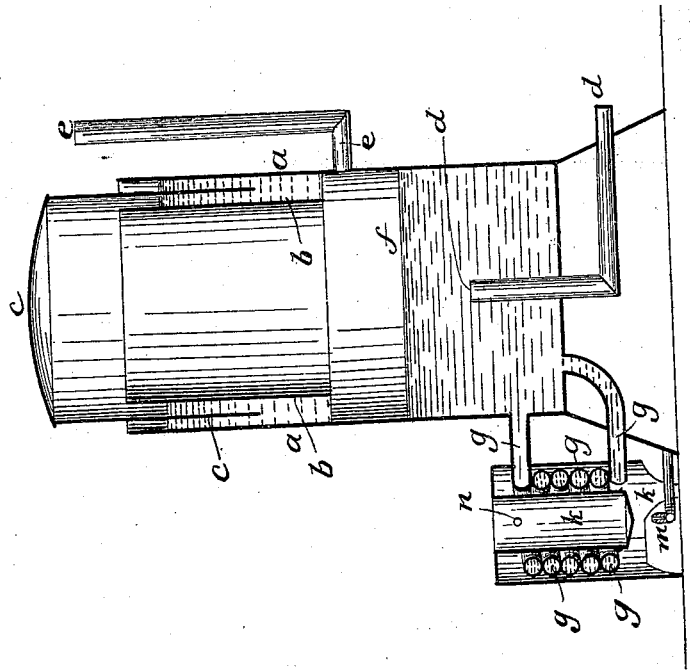
Witnesses:
Inventor:

UNITED STATES PATENT OFFICE.

OAKES TIRRILL, OF BURLINGTON, MASSACHUSETTS.

IMPROVED GAS APPARATUS.

Specification forming part of Letters Patent No. 55,395, dated June 5, 1866.

*To all whom it may concern:*

Be it known that I, OAKES TIRRILL, of Burlington, in the county of Middlesex and State of Massachusetts, have invented certain new and useful Improvements in Apparatus for Generating Illuminating-Gas; and I hereby declare the following to be a full, clear, and exact description of the same, reference being had to the accompanying drawing, which represents a vertical central section of an apparatus with my improvements applied.

My invention relates to the method of generating gas from hydrocarbon fluids by forcing air up through a column of the fluid, so that it shall become so highly charged with hydrocarbon vapor during its passage through the volatile fluid as to form a gas, which may be used for illumination or other suitable purposes.

It is well known that the volatilization of hydrocarbon fluids is accelerated by their being subjected to even a moderate degree of heat, and that, on the other hand, when the fluids are at a low temperature their volatile properties are in a great degree suspended. This is particularly noticeable in a gas-generator, for when the fluid in the reservoir of the generator is cold and comparatively non-volatile the air which passes through it is impregnated or charged with but little vapor, and the gas thus produced is of inferior quality and burns with diminished brilliancy.

The object of my invention is to overcome this defect in generators of hydrocarbon gas and to keep the fluid hydrocarbon at such a degree of temperature as to render it certain that the air passing through it shall be fully charged with vapor. It would be, of course, dangerous, if not impracticable, to heat the hydrocarbon fluid in the generator by placing a flame under the bottom of the reservoir, on account of the volatile and inflammable nature of the liquid; and I have therefore devised a method by which only a small quantity of the fluid is subjected to the action of heat at one time, the apparatus or device for accomplishing this result, composed of a small spiral coil of pipe arranged as will be explained, and heated by a flame, being essentially separate from the fluid-reservoir of the generator, and yet at the same time sufficiently connected therewith to allow the heated fluid to circulate freely through the reservoir and auxiliary heating device, the fluid as it becomes heated passing up through the coil of pipe and giving place to the colder fluid, which enters from below.

In order that my invention may be fully understood, I will now proceed to describe it in detail by reference to the accompanying drawing.

The generator shown in the drawing is composed of the cylindrical case $a$, open at the top. A smaller cylinder, $b$, is secured in the upper part of the case, the space between the two walls $a$ and $b$ forming an annular chamber, in which the cap or dome $c$ fits loosely. The annular chamber is filled with water, and, in conjunction with the sides of the dome $c$, forms a water-joint, which prevents the escape of the charged air, and the dome is at the same time enabled to move up and down in the annular chamber, adjusting itself to the pressure of the gas in the generator.

The air-tube $d$ enters the generator from the bottom of the reservoir, and the gas-pipe $e$ is taken out at any suitable point above the level-line $f$ of the fluid in the reservoir. The machine thus far resembles any ordinary gas-generating apparatus.

Outside the casing $a$, and near the base of the generator, as shown in the drawing, is a small spiral coil of pipe or tubing, $g$, the lower end of the coil being inserted in the bottom of the reservoir and the upper end entering the side of the casing below the level-line $f$. Over this coil a cap, $k$, is loosely fitted, consisting of two cylinders of unequal size arranged concentrically, the space between them forming an annular chamber, in which the coil is received when the cap is placed in position. The two cylinders are secured together at the top, and the bottom of the smaller interior cylinder is closed. A vertical slot is cut in the outer cylinder, so as to enable the cap to pass that portion of the tubing which is inserted in the side and bottom of the generator.

Under the coil and just beneath the bottom of the interior cylinder a gas jet or burner, $m$, being taken out from any convenient point of the generator, is placed, which effects the heating of the fluid in the coil.

When the gas is lighted the flame strikes against the bottom of the cylinder, which may be of a conical shape, as shown in the drawing, or spheroidal, or any other suitable form to deflect the heat. From thence the flame and heat pass into the annular space between the two cylinders surrounding the coil, and heating the fluid therein, and the smoke and heat finally escape through smoke-holes $n$ in the upper part of the cap. The heated fluid, becoming more volatile and of less specific gravity than the colder fluid in the generator, rises and flows through the upper end of the coil into the generator, being displaced by the colder fluid, which enters the coil through its lower end, inserted in the bottom of the reservoir. The cold fluid, being heated in its turn, rises and gives place to that which flows into the coil from the bottom of the generator.

It will thus be seen that the fluid hydrocarbon is kept constantly in motion, there being a continual current through the coil. The liquid, as it becomes volatilized by the heat, rises to the top, and there, gradually losing its heat, drops to the bottom and enters the coil to be again heated and made volatile.

In order to prevent all danger of overheating the fluid in the coil, I propose to use, in connection with the gas-burner, a regulator, by means of which the flame may be automatically increased or lessened or entirely extinguished, so as to maintain the fluid at a certain degree of temperature, and to prevent the possibility of its being in excess of such temperature. This regulator I will not, however, describe at present, as it is my purpose to make it the subject of a separate application for Letters Patent.

Having thus described my invention, what I claim, and desire to secure by Letters Patent, is—

1. In generating illuminating-gas from hydrocarbon fluids, the method described of heating the fluid in a coil or other suitable apparatus, which shall be outside of and separate from the generator and yet at the same time so connected and combined therewith as to cause the fluid to circulate freely and continuously through the said coil or other apparatus and generator, as and for the purposes herein shown and set forth.

2. In combination with apparatus for generating gas, as described, the employment of a spiral coil of pipe or tubing outside of the gas-generator and connected therewith by means of pipes or other suitable device, together with a burner for heating the said coil, substantially as herein described, and for the purposes set forth.

3. In combination with the spiral coil of pipe or tubing, as set forth, the double jacket and cap fitting over said coil, and arranged substantially as and for the purposes herein shown and described.

In testimony whereof I have signed my name to this specification before two subscribing witnesses.

OAKES TIRRILL.

Witnesses:
CHAS. B. F. ADAMS,
A. W. ADAMS.